United States Patent [19]
Tanaka et al.

[11] Patent Number: 5,808,994
[45] Date of Patent: Sep. 15, 1998

[54] DATA REPRODUCTION APPARATUS

[75] Inventors: Shinichi Tanaka, Kanagawa-ken; Isao Kimura, Tokyo, both of Japan

[73] Assignee: Nikon Corporation, Tokyo, Japan

[21] Appl. No.: 964,336

[22] Filed: Nov. 4, 1997

Related U.S. Application Data

[63] Continuation of Ser. No. 660,196, Jun. 3, 1996.

[30] Foreign Application Priority Data

Jun. 2, 1995 [JP] Japan ..................................... 7-136781
Aug. 21, 1995 [JP] Japan ..................................... 7-211680

[51] Int. Cl.$^6$ ....................................................... G11B 7/00
[52] U.S. Cl. ............................................... 369/59; 369/50
[58] Field of Search ................................. 369/59, 47, 48, 369/49, 50, 54, 58, 60, 32, 124; 360/48, 51

[56] References Cited

U.S. PATENT DOCUMENTS

| | | | |
|---|---|---|---|
| 5,258,933 | 11/1993 | Johnson et al. | |
| 5,345,342 | 9/1994 | Abbott et al. | |
| 5,400,189 | 3/1995 | Sato et al. | |
| 5,406,427 | 4/1995 | Shimoda | |
| 5,680,380 | 10/1997 | Taguchi et al. | 369/59 X |
| 5,699,337 | 12/1997 | Kobayashi | 369/59 |
| 5,719,843 | 2/1998 | Nakajima et al. | 369/59 |

*Primary Examiner*—Muhammad N. Edun
*Attorney, Agent, or Firm*—Oliff & Berridge, PLC

[57] ABSTRACT

A data reproduction apparatus includes a PR-equalizing circuit which equalizes data reproduction signals recorded on a recording medium based on a partial response system and produces output signals, a binary code circuit which changes output signals from the PR-equalizing circuit into binary signals, a clock generation circuit which generates clock signals synchronized to the edges of the binary signals, A/D converters which sample the output signals from the PR-equalizing circuit based on the clock signal and generates sample data, decoding circuits which decode the sample data based on a predetermined ideal amplitude value and generates reproduced data, and a synthesis circuit which synthesizes reproduced data from the decoding circuits. A second data reproduction apparatus includes an equalizing circuit which equalizes wave pattern reproduction signals by means of a partial response method, a binary code circuit which changes the wave pattern equalized reproduction signals into binary coded signals, a PLL circuit which generates clock signals synchronized with the edges of the binary coded signals, coding circuits which transform the wave pattern equalized reproduction signals into binary signals by means of the clock signals from the PLL circuits, and a synthesis circuit which synthesizes the binary signals from the coding circuits.

6 Claims, 12 Drawing Sheets

DATA REPRODUCTION APPARATUS

This is a Continuation of application Ser. No. 08/660,196 filed Jun. 3, 1996.

BACKGROUND OF THE INVENTION

1. Field of the Invention

The present invention relates to a data reproduction apparatus which reproduces data recorded on a recording medium.

2. Description of Related Art

The use of a disk type recording medium such as a magneto-optical disk has been spreading rapidly in recent years. This is primarily due to capabilities which enable users to record data as needed and to readily reproduce the recorded data.

FIG. 16 illustrates a principle behind recording data onto magnetic magneto-optical disks.

A magneto-optical disk 22 is normally magnetized in the upper direction, the direction facing a recorder and/or a reader; (the direction of the arrows in the figure). In recording data on magneto-optical disk 22, a pulse-like laser beam from laser 11 corresponding to the data to be recorded is emitted. Then, the recording section 22A of the magneto-optical disk 22 on which the data is recorded, becomes heated due to heat illumination from the laser beam and is magnetized by magnetic field 12 generated from the magnetic field generator in the direction of the dotted arrow in the figure. In this manner, marks are recorded on the recording section 22A of disk 22 corresponding to the data by reversing the magnetization of the magneto-optical disk.

The digital user data recorded on the magneto-optical disk 22 in this manner, are generated by a reproduction apparatus (not shown). However, when the data is recorded with high density bits, the reproduction wave pattern is generated with the bit intervals interfering with each other, resulting in the failure to accurately discriminate the data. A system called a partial response system is used to reproduce the data.

In other words, the reproduction signals of the data recorded on the magneto-optical disk 22 are transformed by means of a circuit called a PR-equalizing circuit and PR signals (partial response signals) are generated. Moreover, these PR signals are sampled by the clock signals generated from the PR signals and the sample data are generated.

The sample data, thus created, is decoded by a decoder (namely, bit-by-bit decoder or viterbi decoder to be explained later) based on the ideal amplitude value and is output as reproduced data.

In this case, in each of the systems, PR systems which use bit-by-bit decoders or a PRML system which use a viterbi decoder, the above mentioned ideal amplitude value is preestablished with value of N (where N is an integer greater than 1). In the case of the bit-by-bit decoder, the threshold level is determined from these ideal amplitude values and the reproduction data is generated by executing decoding based on the threshold level. Moreover, in the case of viterbi decoder, viterbi decoding is executed from the ideal amplitude value and reproduction data is generated.

However, the recording conditions in recording the user data on the magneto-optical disk are not necessarily uniform and the actual length of the data stream recorded varies due to the fluctuation of the atmospheric temperature, and the laser power and the like used to record the data. This occurs even if data with predetermined bit lengths is intended to be recorded. Moreover, the magneto-optical disk on which user data is recorded may not always be reproduced by the same reproduction apparatus. As a result, the length of the data recorded on the magneto-optical disk reproduced by different reproduction apparatus is not consistent.

Such inconsistencies of the data length during recording user data and during reproduction of the data causes a shift in the wave pattern of the reproduction signals from the magneto-optical disk. As a result, sample data generated by PR-equalizing the reproduction data differ depending on the above-described conditions of recording and reproduction.

In the prior art, the ideal amplitude value of sample data necessary for each decoding process for a bit-by-bit decoder of the PR system and a viterbi decoder of PRML system, is set as a fixed value regardless of the condition for recording and reproduction of user data as described above. This procedure creates a shift between the ideal amplitude value and its sample data to be processed. Hence, it becomes impossible to correctly decode the data in the bit-by-bit decoder and in the viterbi decoder. As a result, a problem occurs that the number of errors in the data reproduced by each recorder increases.

Considering the problems described above, it is an object of the present invention to provide a data reproduction apparatus capable of reproducing data accurately, regardless of the conditions during recording.

SUMMARY OF THE INVENTION

In order to resolve the problems described above, the present invention comprises a PR-equalizing circuit which equalizes data reproduction signals recorded on a recording medium based on a partial response system. A binary code circuit which changes output signals from the PR-equalizing circuit into binary codes is provided with a first clock generation circuit which generates a first clock signal synchronized to the leading edge of the binary coded signals, a second clock generation circuit which generates a second clock signal synchronized to the trailing edge of the binary coded signals. Also included are a first A/D converter which samples the output signals from the PR-equalizing circuit based on the first clock signal and generates a first set of sample data, a second A/D converter which samples the output signals from the PR-equalizing circuit based on the second clock signal and generates a second set of sample data. A first decoding circuit which decodes the first sample data based on the predetermined ideal amplitude value and generates the reproduced data and a second decoding circuit which decodes the second sample data based on the predetermined ideal amplitude value and generates the reproduced data are also provided. A synthesis circuit which synthesizes the output signals from the first and the second decoding circuit is also included.

Moreover, embodiments of the present invention may include a training pattern in the reproduction signals to compute the ideal amplitude value. Embodiments of the present invention may further comprise first and second pattern reading circuits which respectively integrate sample data of the training patterns output from each of the first and the second A/D converters during the output of the control signals, indicating that the training patterns are being reproduced. A first and a second ideal value determining circuit, which determine each ideal amplitude value from each sample data being output from the first and the second pattern reading circuits, respectively, may also be included.

Furthermore, the first ideal value determining circuit may determine an ideal amplitude value from the sample data synchronized to the leading edge of the binary coded signals and the second ideal value determining circuit may determine an ideal amplitude value from the sample data synchronized to the trailing edge of the binary coded signals.

Moreover, embodiments of the present invention comprise an equalizing circuit which equalizes wave pattern reproduction signals by means of a partial response method. Embodiments of the present invention include a binary code circuit which changes the reproduction signals into binary codes, a first PLL circuit which generates clock signals synchronizing the leading edge of the binary coded signals from the binary code circuit and a second PLL circuit which generates clock signals synchronizing the trailing edge of the binary coded signals from the binary code circuit. Also included are a first coding circuit which transforms the reproduction signals equalized to the wave pattern into binary coded signals by means of the clock signals from the first PLL circuit and a second coding circuit which transforms the reproduction signals equalized to the wave pattern into binary coded signals by means of the clock signals from the second PLL circuit. A synthesis circuit synthesizes the output signals from the first and the second decoding circuits.

Furthermore, a data reproduction apparatus comprises an equalizing circuit which equalizes wave pattern reproduction signals by means of a partial response method, a binary code circuit which changes the reproduction signals into binary codes, a first PLL circuit which generates clock signals synchronizing the leading edge of the binary coded signals from the binary code circuit, a second PLL circuit which generates clock signals synchronizing the trailing edge of the binary coded signals from the binary code circuit, a first A/D converter circuit which A/D-transforms the reproduced signals having equalized wave pattern with the clock signal timing pulses from the first PLL circuit, a second A/D converter circuit which A/D-transforms the reproduced signals having equalized wave pattern with the clock signal timing pulses from the second PLL circuit, a first decoding circuit which transforms the output signals from the first A/D converter circuit into binary signals, a second decoding circuit which transforms the output signals from the second A/D converter circuit into binary signals, and a synthesis circuit which synthesizes the output signals from the first and the second decoding circuits, an equalizing circuit which equalizes wave pattern reproduction signals by means of a partial response method, a binary code circuit which changes the reproduction signals into binary codes, a first PLL circuit which generates clock signals synchronizing the front edge of the binary coded signals from the binary code circuit, a second PLL circuit which generates clock signals synchronizing the back edge of the binary coded signals from the binary code circuit, a first A/D converter circuit which A/D-transforms the reproduced signals having equalized wave pattern with the clock signal timing pulse from the first PLL circuit, a second A/D converter circuit which A/D-transforms the reproduced signals having equalized wave pattern with the clock signal timing pulse from the second PLL circuit, a first decoding circuit which transforms the output signals from the first A/D converter circuit into binary signals, a second decoding circuit which transforms the output signals from the second A/D converter circuit into binary signals, and a synthesis circuit which synthesizes the output signals from the first and second decoding circuits.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

In writing signals on a magneto-optical disk, writing is accomplished by modulating a laser beam intensity to illuminate a portion of the disk. This is done based on rectangular wave signals. In reproducing the written signals, the wave pattern obtained from the head where the laser beam is emitted, in general, has rounded transitions, more so than the waveform input to the head (rectangular waves). This is due to restrictions on the decomposing capability of the lens used in the head.

When the reproduction signals become rounded, problems occur especially when the recording density of the disk is high. In other words, the higher the recording density, the higher the frequency of the reproduction signals and the shorter the period of the wave pattern of the reproduction signals. Under such conditions, the wave pattern to be read can be interfered with by adjacent wave patterns (between-code interference). Between-code interference can cause errors during data detection.

Figure 3A:
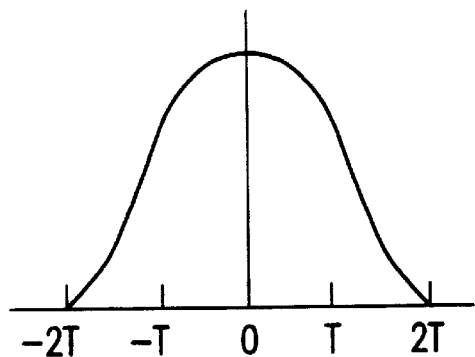
FIGS. 3(a)–3(e) are a series of graphical representations illustrating the signals reproduced by the data reproduction apparatus of the present invention.
Figure 3B:
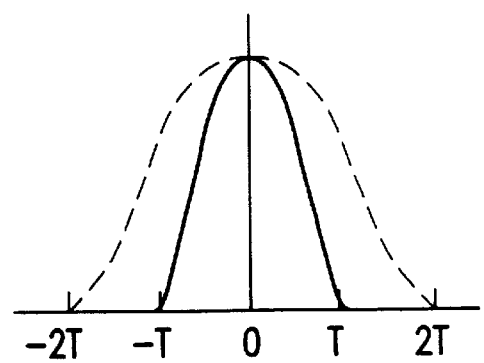
Figure 3C:
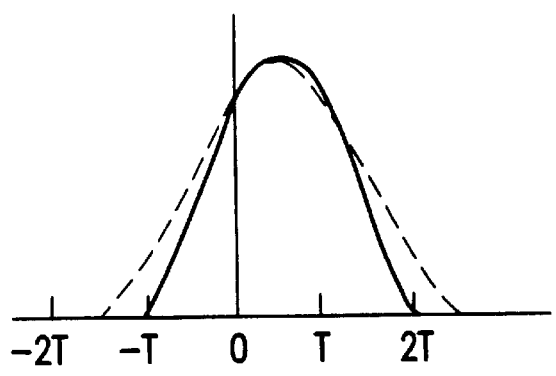

FIGS. 3(a)–3(e) illustrates an example of a method to remove between-code interference. FIG. 3(a) describes a typical reproduction wave pattern. However, if the recording density of the magneto-optical disk increases, between-code signal wave pattern interference may occur in which the isolated wave pattern being read interferes with an adjoining wave pattern. Between-code interference may cause an error during data detection. To prevent this, the wave pattern is narrowed using a transversal filter, such as that illustrated in FIG. 3(b). However, in trying to narrow the wave pattern using a transversal filter, the high frequency component is emphasized, causing noise to increase with a corresponding reduction in the signal to noise ratio.

Figure 7:
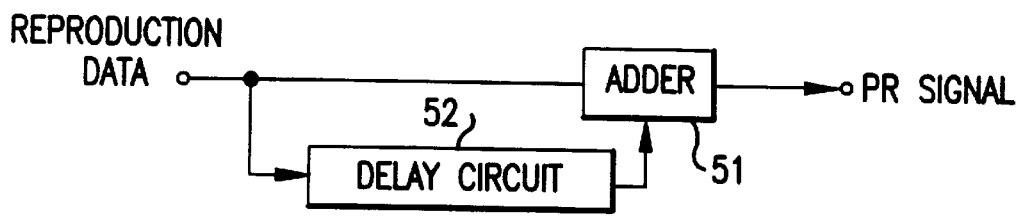
FIG. 7 is a block diagram illustrating an equivalent circuit which achieves PR(1,1) characteristics.

The PR(1,1) system provides a method in which between-code interference is intentionally created equivalent to the characteristics obtained in a circuit such as that illustrated in FIG. 7. In the circuit of FIG. 7, an input signal is input to an adder 51. At the same time, another input signal is delayed by 1T (where T is the amount of time equivalent to one bit) by a delay circuit 52, which is then input to adder 51. In adder 51, both signals are added and partial response signals are output. In the partial response system of FIG. 4, to be explained later, signals having characteristics equivalent to those of the circuit in FIG. 7, are created in the reproduction system from magneto-optical disk 22 using the PR-equalizing circuit 23 via head 15 and a lowpass filter 16. As a result, the isolated wave pattern described in FIG. 3(a) becomes a partial response wave pattern similar to FIG. 3(c) and the amount of wave pattern narrowing becomes greater than FIG. 3(b). As a result, the high region component of the signal is controlled and the signal to noise ratio is greatly improved.

Figures 3D, 3E:
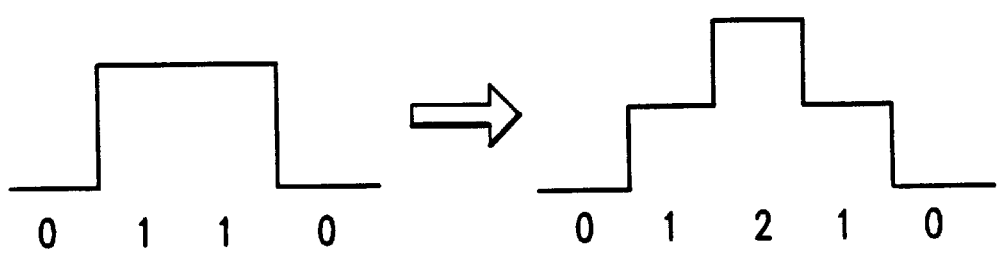

Moreover, in interpreting the wave equalizing process of such PR(1,1) system using data, the data [0110] of the wave pattern before partial response equalization illustrated in FIG. 3(d) is transformed to [01210] as illustrated in FIG. 3(e).

Figure 4:
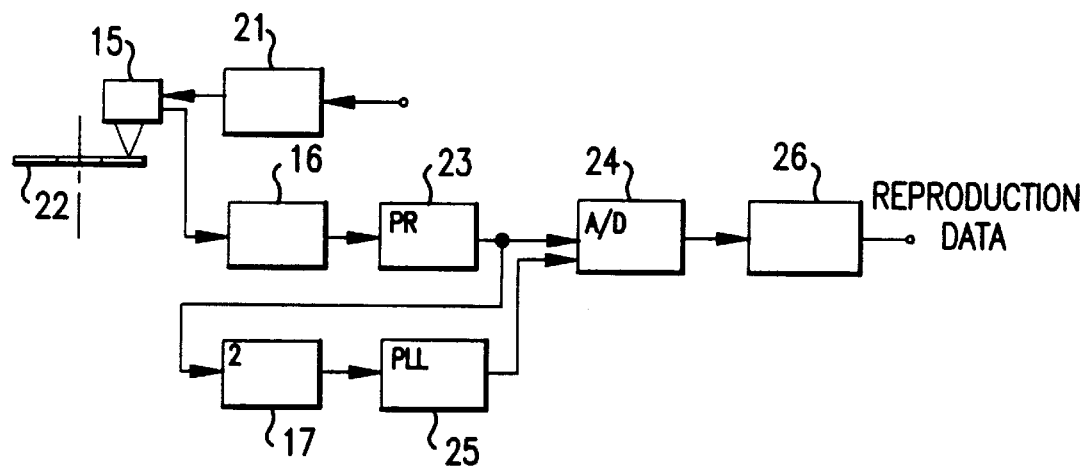
FIG. 4 is a block diagram illustrating a PR system from the data reproduction apparatus of the present invention.
Figure 5:
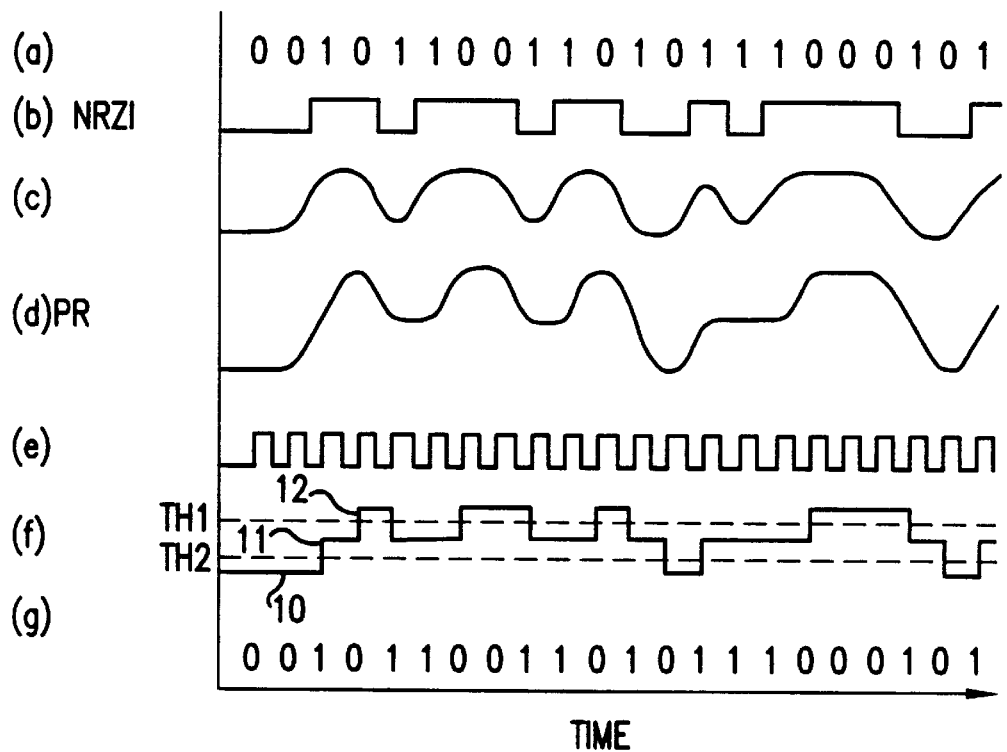
FIG. 5 is a diagram illustrating the operation wave pattern of each unit in the PR system.

FIG. 4 illustrates a partial response system (hereafter PR system) to execute recording or reproduction of data based on the PR(1,1) system. FIG. 5 illustrates the operation wave pattern of each unit of the PR system.

Figure 6:
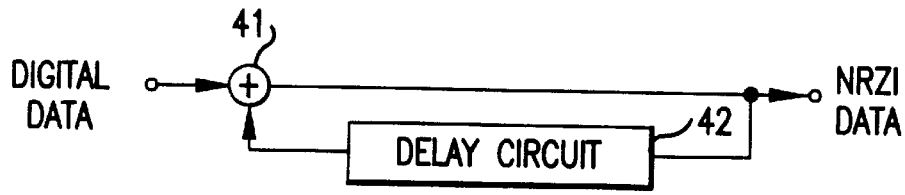
FIG. 6 is a block diagram illustrating a precoder which is used in the PR system to perform NRZI-transformations.

Precoder 21 illustrated in FIG. 4 transforms entering digital data shown in FIG. 5(a), which is an output from an external circuit (not shown), into pattern data shown in FIG. 5(b). Such pattern transformation is called NRZI (non return to zero) transformation and is achieved by adder 41, which performs a module 2 addition as illustrated in FIG. 6, and by the delay circuit 42, which delays the data one bit. In other words, adder 41 executes a module 2 addition of the digital data being input and the data which is delayed by one bit and outputs a signal recorded on magneto-optical disk 22 as NRZI data.

NRZI transformation provided by precoder 21 becomes necessary because it prevents error transmission in a process by bit-by-bit decoding which is performed during reproduction, as will be explained later.

In lowpass filter 16, the high range noise outside of the reproduction signal band is reduced and is output to the PR-equalizing circuit 23, which is a transversal filter. The PR-equalizing circuit 23 equalizes the wave pattern so that reproduction signals become a partial response wave pattern, generates the PR signal as described in FIG. 5 (d), and provides a signal to converter 24 and binary code circuit 17.

At binary code circuit 17, the partial response signals are changed to binary codes. At PLL circuit 25, the clock signals illustrated in FIG. 5(e) are extracted from the binary coded signals output by binary code circuit 17 and are input to A/D converter 24. At A/D converter 24, the PR signals are sampled by the clock signals and, ternary code data such as i2, i1 and i0 shown in FIG. 5(f) are generated and provided to bit-by-bit decoder 26 as sample data.

Here, due to noise, etc. caused by conditions of is the recording medium (magneto-optical disk), the recording operation of the medium, the reproduction circuit which reproduces the data from the medium, and the like, fluctuations occur on the PR signals of FIG. 5 (d). As a result, the distribution of the amplitudes of actual sample data has peaks centering around ternary codes, i2, i1 and i0. Here central values i2, i1, i0 are called ideal amplitude values.

At the bit-by-bit decoder 26, the sample data input are transformed as reproduction data illustrated in FIG. 5(g) and are output.

Figure 8:
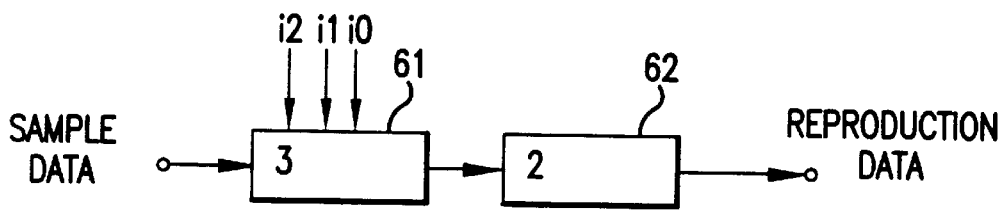
FIG. 8 is a block diagram illustrating a bit-by-bit decoder to be used in the PR system.

FIG. 8 is a block diagram illustrating bit-by-bit decoder 26 which comprises a ternary coded decoder 61 and a binary coded decoder 62. When the ideal amplitude values are input from an external apparatus (not shown), the ternary coded decoder 61 establishes threshold value levels TH1 and TH2 (FIG. 5 (f)) between i2 and i1 and between i1 and i0 respectively. A determination is made as to which logic is the above-mentioned sample data based on the threshold value levels.

Here, in establishing the threshold level from the ideal amplitude values input in the ternary coded decoder 61, the central value between i2 and i1 and the central value between i1 and i0 may be used as threshold values.

Binary coded decoder 62 whose input is the output from the ternary coded decoder 61, outputs respectively, [0] as reproduction data if the ternary coded decoder determines logically that the maximum value or the minimum value is present and [1] as reproduction data if the ternary coded decoder determines logically that the central value is present. As a result, the digital data in FIG. 5(a) recorded on the magneto-optical disk 22 and the reproduction data in FIG. 5(g) become the same in the PR system described in FIG. 4, as long as certain sample point data do not contain fluctuation which exceeds the threshold value due to above-mentioned signal noise distortion.

However, if the fluctuation which occurs in the PR signals in FIG. 5(d) is large enough to cause data of an arbitrary sample point to exceed the threshold level due to the added noise caused by the conditions of the medium and the recording conditions of the medium, the fluctuation results directly in a bit error of the reproduction data. As a result, a PRML system is provided which uses the viterbi decoder 76 shown in FIGS. 9 and 10 instead of the bit-by-bit decoder 26 in order to minimize the occurrence of such bit error.

Figure 9:
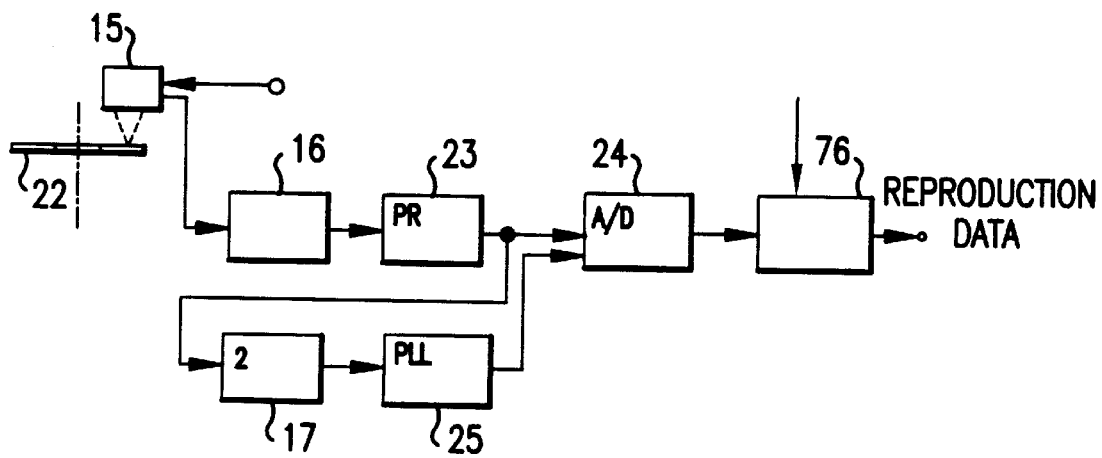
FIG. 9 is a block diagram illustrating a PRML system from the data reproduction apparatus of the present invention.

In a PRML system described in FIG. 9, a head 15, a magneto-optical disk 22, a lowpass filter 16, a PR-equalizing circuit 23, a binary coded circuit 17, an A/D converter 24 and a PLL circuit 25 are used similar to PR system in FIG. 4. The precoder for NRZI transformation which is needed for the PR system in FIG. 4 becomes unnecessary for the PRML system of FIG. 9 which uses the viterbi decoder 76.

Figure 10:
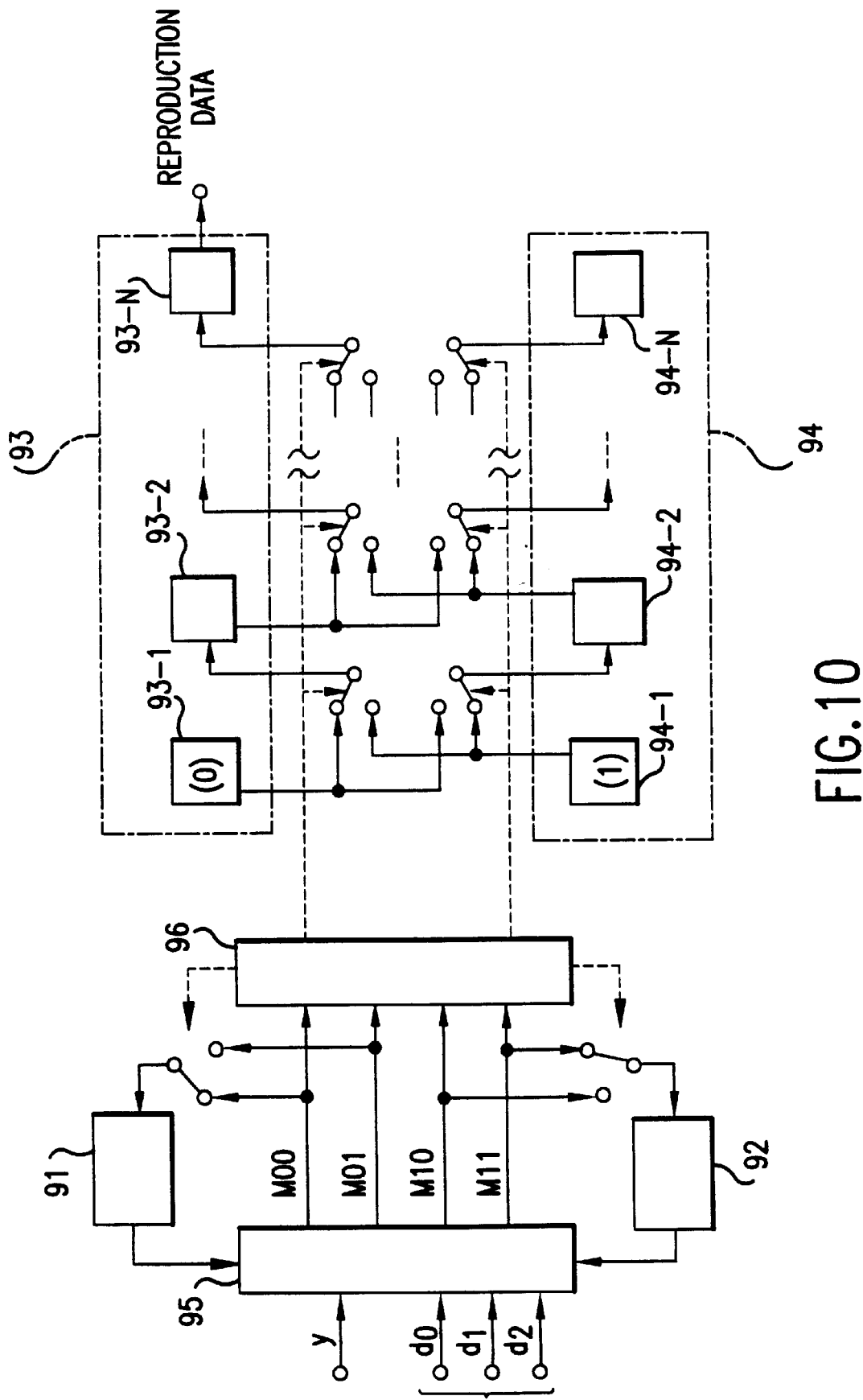
FIG. 10 is a block diagram illustrating a viterbi decoder used in the PRML system.

FIG. 10 is a block diagram illustrating a viterbi decoder 76 used in a PRML system. The viterbi decoder comprises two condition registers 91, 92, two N-bit (N is an arbitrary natural number) data path registers 93, 94, a condition algorithm circuit 95, and a discrimination circuit 96. Here, [0] is set for the lowest bit of the data path register 93 and [1] is set for the lowest bit of the data path register 94.

Moreover, each time sample data (sample data is to be denoted by y) are given from the A/D converter 24, the viterbi decoder 76 executes the following process.

To begin with, four values M00, M01, M10 and M11 are computed using equations (1)–(4) below in the condition algorithm circuit 95, based on values M0 and M1 from the two condition registers 91 and 92, sample data output y from A/D converter 24, and expected values d0, d1 and d2 of the sample data provided by an external apparatus (not shown). Here, d2, d1 and do correspond to the maximum, the central and the minimum values, respectively, and d2=i2, d1=i1, d0=i0 when the sample data of the above-mentioned ideal amplitude values are i2, i1 and i0, respectively.

$$M00 = M0 - 2 \cdot y \cdot d0 + d02 \quad (1)$$

$$M01 = M1 - 2 \cdot y \cdot d1 + d12 \quad (2)$$

$$M10 = M0 - 2 \cdot y \cdot d1 + d12 \quad (3)$$

$$M11 = M1 - 2 \cdot y \cdot d2 + d22 \quad (4)$$

Next, discrimination circuit 96 compares the values of M00 and M01 and determines which is the largest.

Then, discrimination circuit 96 stores the value of M00 into the condition register 91 if M00<M01 and shifts the values of (N−1)st to 0th bit upward by one bit in data path register 93.

Moreover, discrimination circuit 96 stores the value of M01 into the condition register 91 if M00≧M01 and copies the values of the (N−1)st to the 0th bit in the data path register 94 into the Nth to the 1st bit in the data path register 93.

Next, discrimination circuit 96 compares the values of M10 and M11 and determines which is the largest.

Then, discrimination circuit 96 stores the value of M11 into the condition register 92 if M10>M11 and shifts the values of (N−1)st to 0th bit upward by one bit in data path register 94.

Moreover, discrimination circuit 96 stores the value of M10 into the conditional register 92 if M10≦M11 and copies the values of the (N−1)st to the 0th bit in the data path register 93 into each of Nth to 1st bit in the data path register 94.

Then, discrimination circuit 96 externally outputs the highest bit in the data path register 93 as the reproduced data.

In this manner, when sample data are input, the viterbi decoder 76 does not execute a hard decision like the bit-by-bit decoder 26 in which ⌈0⌋ or ⌈1⌋ is determined depending on certain threshold level concerning the data, but it executes a soft decision in which a more certain data path is determined by paying attention to the conditions before and after the data.

Hence, the two data path registers 93 and 94 converge to either ⌈1⌋ or ⌈0⌋ each time a shift operation is executed. The data are certainly determined to be either ⌈1⌋ or ⌈0⌋ by the time the data reach the highest bit and are output as reproduction data.

Here, if the bit number N of the data path register is small, the data may not be certainly determined to be either ⌈0⌋ or ⌈1⌋. The larger the bit number N becomes, the smaller the probability of certainty and the bit error of the reproduction error can be minimized. Hence, by making the bit numbers of the two data path registers 93 and 94 large, the data are determined, and the highest bit of either register may be output as the reproduction bit. In the example the highest bit of the data path register 93 is output as the reproduction data.

Here, in the viterbi decoder 76, survival data path discrimination is performed in discrimination circuit 96 in which the occurrence probability of each data path is computed by the condition algorithm circuit 95. The data path with the higher survival out of two data paths which are the result of processing by the condition algorithm circuit 95, is selected as the survival data path. Data path registers 93 and 94 store two survival data paths while the condition registers 91 and 92 are assigned to store occurrence probabilities of each survival data paths.

The operations of the PR system and the PRML system are described, but ternary codes of an ideal amplitude value for decoding three level data are necessary because reproduction data is generated from the PR signal sample data in either system. The threshold value level is established from these ideal values in the bit-by-bit decoder 26 of the PR system and the sample data is changed to binary codes based on the threshold value level. Moreover, in the viterbi decoder 76 of the PRML system, these ideal amplitude values are used as expected values in decoding sample data.

However, recording conditions in recording digital data on the magneto-optical disk 22 are not necessarily the same. Therefore, the length of the mark actually recorded on magneto-optical disk fluctuates due to the fluctuation of laser power and the like to record data. The length of the mark may also fluctuate due to surrounding temperature during recording even if data with a predetermined length corresponding to digital data is desired to be recorded. Moreover, the magneto-optical disk may not always be reproduced by the same reproduction apparatus. Thus, the length of the mark reproduced may be inconsistent when the mark recorded on the magneto-optical disk 22 is reproduced by different reproduction apparatus.

If the ideal amplitude value necessary for each decoding process in the bit-by-bit decoder 26 or the viterbi decoder 76 is fixed, the fixed ideal amplitude value may not match the amplitude distribution of the sample data of the user data desired to be reproduced. This results in a problem that a bit error occurs too frequently in the reproduced data which is decoded based on the ideal amplitude value.

Figure 11:
FIG. 11 is a diagram illustrating recording conditions of the data on a magneto-optical disk.

Therefore, as described in FIG. 11, a training pattern to compute the ideal amplitude value is recorded in the training pattern region TP. This region is adjacent to the tip section of the user data DT where the user data in the magneto-optical disk 22 are recorded. Moreover, by fixing this training pattern to be the pattern illustrated in FIG. 12(a), a pattern is provided in which all the ternary coded levels are included as sample data, after being PR-equalized and sampled as shown in FIG. 12(b).

Figure 13:
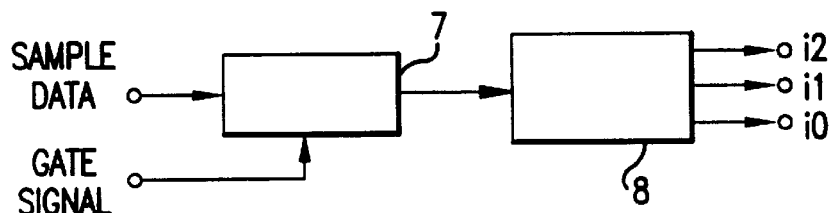
FIG. 13 is a block diagram illustrating a portion of the information reproduction system.
Figure 16:
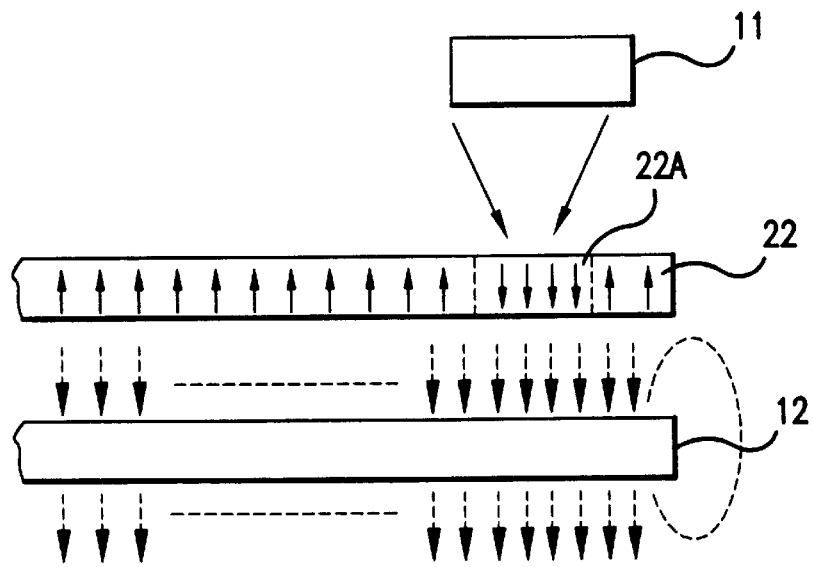
FIG. 16 is a diagram illustrating a typical recording pattern for data on a magneto-optical disk.

The sample data of the training data thus obtained are integrated in the pattern reading circuit 7 illustrated in FIG. 13. This integration is based on the gate signals from an external control circuit (not shown) during the reproduction of the pattern and are output to the ideal value determining circuit 8. Furthermore, in ideal value determining circuit 8 illustrated in FIG. 13, the ideal amplitude values i2, i1 and i0 correspond to ternary code levels of the maximum, the central and the minimum levels from the training pattern sample data.

As a first method of determining the ideal amplitude values, a method may be considered in which sample data integrated in the pattern reading circuit 7 are screened into three logic levels in order of appearance in the ideal value determining circuit 8. This circuit uses two threshold levels, and each of the first sample data belonging to each group is made to be the ideal amplitude value for respective logic level. Using this method, i20, i10 and i00 among the data illustrated in FIG. 12(b) are selected as the ideal amplitude values i2, i1 and i0.

A second method may be considered in which the integrated sample data are screened into three logic levels in order of appearance in the ideal value determining circuit 8. This is done using two threshold levels as before, followed by computing the averages of M (an integer greater than 1) sample data belonging to each group. These are output as the ideal amplitude values i2, i1 and i0. Using this method, a shift in ideal amplitude values due to dispersion of sample data caused by noise generated when the data is read, may be prevented. Here, the threshold value levels to be used in screening the logic levels performed in the first and the second methods described above, can always be fixed values or can be computed from the ideal amplitude values obtained immediately before data reading.

The ideal amplitude values i2, i1 and i0 thus determined by the ideal value determining circuit 8 are given to either the bit-by-bit decoder 26 or the viterbi decoder 76 and are used in decoding the user data to follow. In this case, at the bit-by-bit decoder 26, the threshold value levels are determined from the ideal amplitude value given as described above. Then the sample data in the user data region DT, which are reproduced subsequently, are decoded based on the threshold value levels and are output as reproduced data. In the viterbi decoder 76, the ideal amplitude values are used as expected values described above, and the sample data in the subsequent user data region DT are decoded based on the expected values. As a result, the sample data of user data may be decoded accurately.

Figure 14:
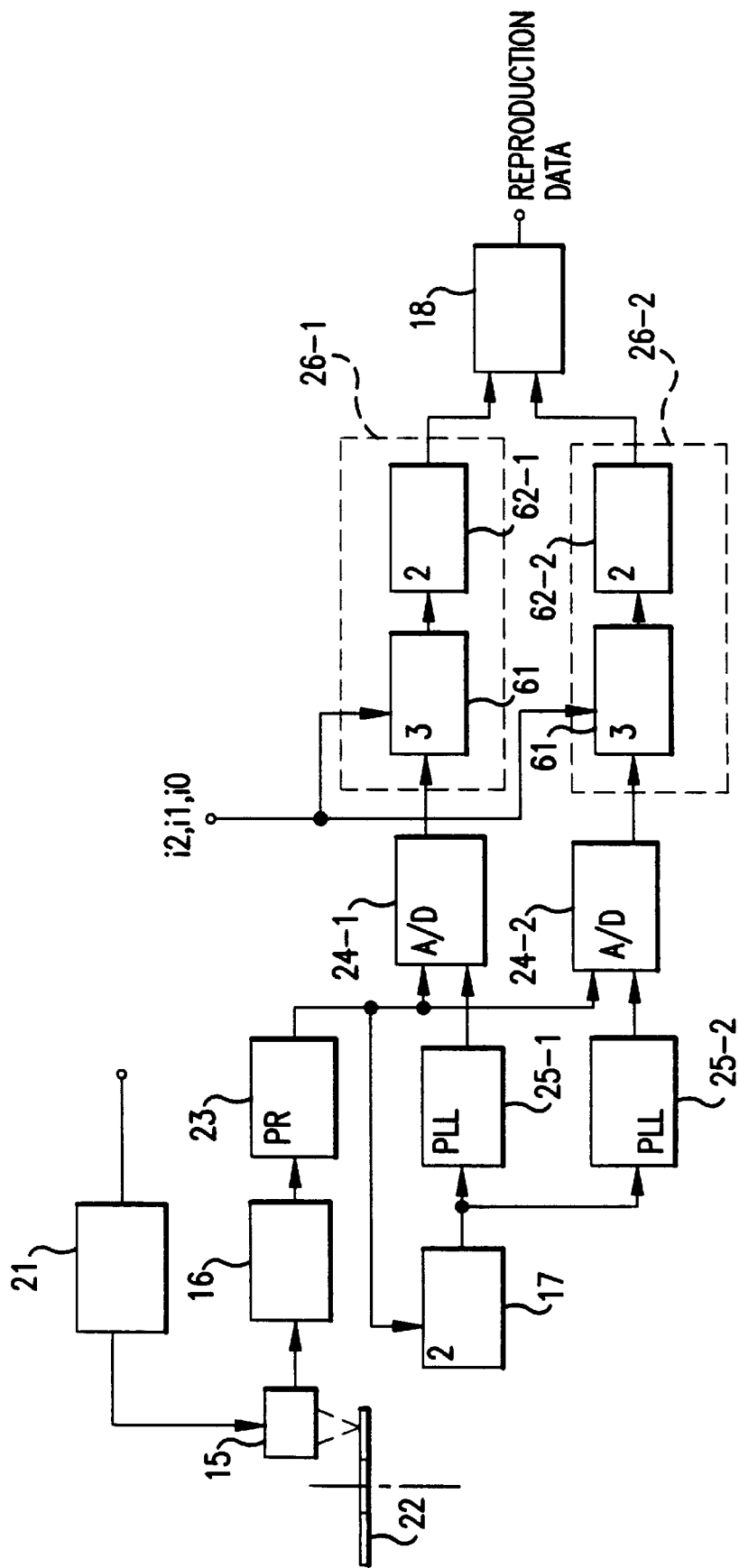
FIG. 14 is a block diagram illustrating an example of a PR system shown in FIG. 4 which contains a plurality of PLL circuits, A/D converter and a bit-by-bit decoder.

Next, FIG. 14 illustrates another PR system in which correct decoding is possible even when data recording conditions for the magneto-optical disk 22 are different and user data is recorded longer or shorter than the reference value. In addition, FIG. 15 illustrates the operation of the PR system.

PR system described in FIG. 14 is composed of two A/D converters 24-1, 24-2, two PLL circuits 25-1, 25-2, and two bit-by-bit decoders 26-1, 26-2, respectively, similar to A/D converter 24, PLL circuit 25 and the bit-by-bit decoder in the PR system of FIG. 4. Outputs from each bit-by-bit decoder 26-1 and 26-2 are synthesized by data synthesizing circuit 18 and are output as reproduction data.

Figure 15:
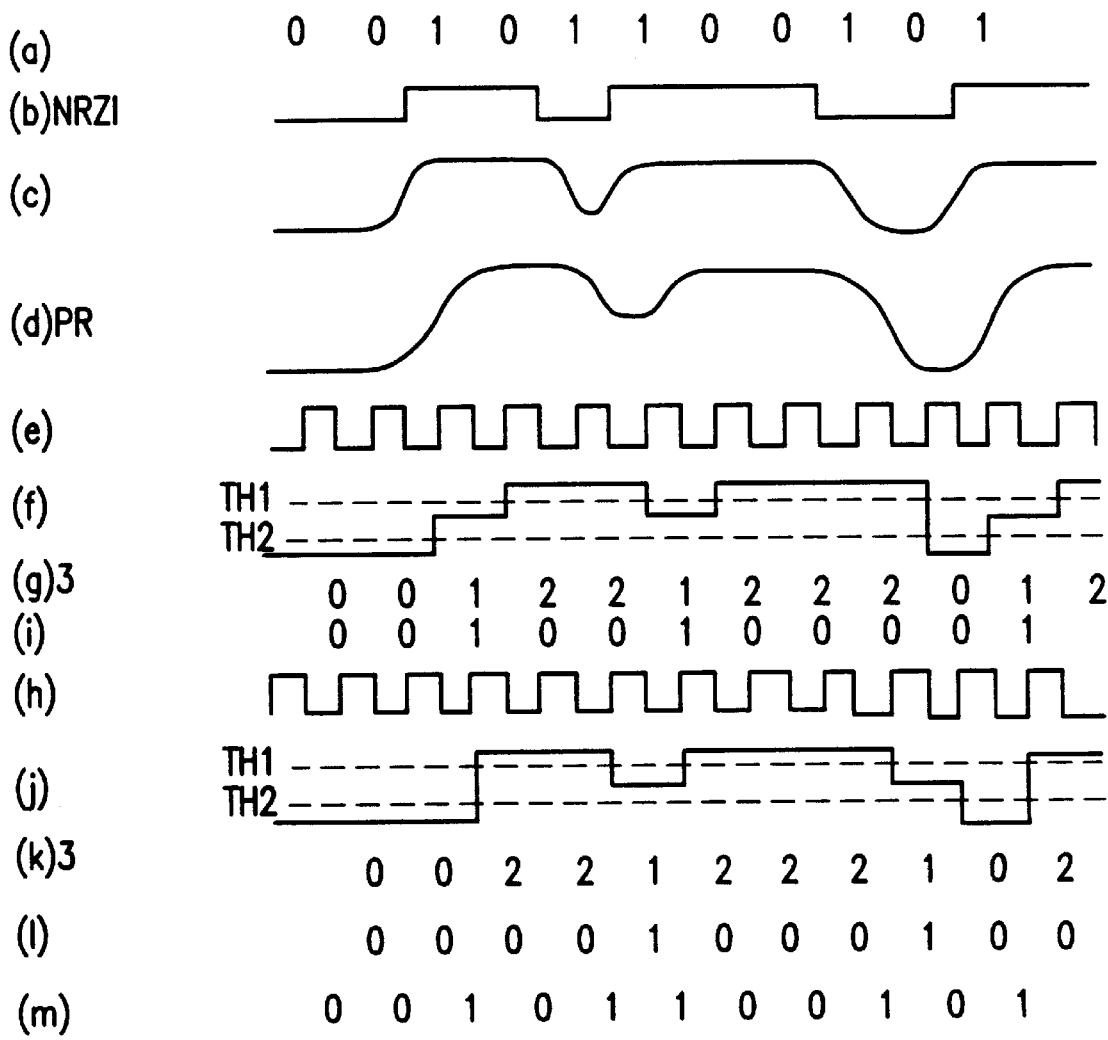
FIG. 15 is a diagram illustrating the operation wave pattern of each unit of the PR system in FIG. 14.

The digital data illustrated in FIG. 15(*a*) is transformed to NRZI data similar to the data illustrated in FIG. 15(*b*) by precoder 21 and is recorded from head 15 to magneto-optical disk 22. The reproduction signals illustrated in FIG. 15(*c*), which are read from the magneto-optical disk 22 by the head 15 and which pass through lowpass filter 16, are sent to the PR-equalizing circuit 23 where they are PR-equalized by the PR-equalizing circuit 23 and are transformed to the PR signals illustrated in FIG. 15(*d*). The PR signals are input to A/D converters 24-1 and 24-2 as well as to binary code circuit 17 where they are changed to binary codes.

At PLL circuits 25-1 and 25-2, clock signals are extracted from the binary coded signals of binary code circuit 17. However, if the length as recorded is longer or shorter on magneto-optical disk 22 due to differences in the recording conditions described above, and if the PR signals are produced by reproducing the data and if the clock is extracted from the PR signals, the duty of the clock extracted is not 50%, resulting in duty deflection.

In PLL circuit 25-1, the leading edge of the clock signal which is synchronized to the leading edge illustrated in FIG. 15(*e*) is generated so that A/D converter 24-1 may perform sampling. Once the leading edge (rise) of the binary coded signals from binary code circuit 17, and the leading edge of the clock signal are synchronized, this is input to A/D converter 24-1. Moreover, in PLL circuit 25-2, the trailing edge of the clock signal which is synchronized to the trailing edge illustrated in FIG. 15(*i*) is generated so that A/D converter 24-2 may perform sampling. By synchronizing the trailing edge (falling edge) of the binary coded signals from the binary code circuit 17, and the trailing edge of the clock signal, it can be fed to the A/D converter 24-2.

A/D converter 24-1 samples the PR signals by the leading edge of the clock signals illustrated in FIG. 15(*e*), and provides sample data similar to data illustrated in FIG. 15(*f*) to ternary coded circuit 61 in the bit-by-bit decoder 26-1. When the ideal amplitude values are i2, i1 and i0, ternary coded decoder 61 establishes the threshold value levels TH1 and TH2 between i2 and i1 and between i1 and i0, respectively. Based on these threshold value levels, ternary coded decoder 61 determines which logic is the above-mentioned sample data. Ternary code decoder 61 then generates ternary coded data comprising the maximum (=2), the central (=1) and the minimum (=0), which are output to binary coded decoder 62-1. Binary coded decoder 62-1 generates two value decode data shown in FIG. 15(*h*). It outputs ⌈1⌋ when the ternary code data input is ⌈1⌋ immediately followed by ternary code data ⌈2⌋ and outputs ⌈0⌋ otherwise, and sends the decode data to data synthesizing circuit 18.

At A/D converter 24-2 the PR signals are sampled by the trailing edge clock signals illustrated in FIG. 15(*i*) which are received from PLL circuit 25-2, and outputs sample data similar to data illustrated in FIG. 15(*j*) to the ternary coded circuit 61 in the bit-by-bit decoder 26-2. When the ideal amplitude values are i2, i1 and i0, ternary coded decoder 61 establishes the threshold value levels TH1 and TH2 between i2 and i1 and between i1 and i0, respectively. Based on these threshold value levels, ternary coded decoder 61 determines which logic value is the above-mentioned sample data. Ternary code decoder 61 generates the ternary code data illustrated in FIG. 15(*k*). Binary coded decoder 62-2 generates two value decode data shown in FIG. 15 (1). Binary coded decoder 62-2 outputs ⌈1⌋ when the ternary code data input is ⌈1⌋ immediately preceded by ternary code data ⌈2⌋ and outputs ⌈0⌋ otherwise, and sends the decode data to data synthesizing circuit 18.

In data synthesizing circuit 18, binary code data shown in FIG. 15(*h*) and 15(*l*) are synthesized, which are received from each binary coded decoder 62-2 of the bit-by-bit decoders 26-1 and 26-2, and binary reproduction data showing in FIG. 15(*m*) is generated. As a result the same data as the digital data shown in 15(*a*) is reproduced.

In this manner, the data recorded on the magneto-optical disk 22 is reproduced, each reproduced signal synchronized to the leading edge and the trailing edge of the clock signal generated. Using each clock pulse to extract and synthesize information corresponding to each of the leading edge and the trailing edge, original digital data may be restored even if the data is recorded longer or shorter than the reference value due to changes in recording conditions.

However, if the recording density of the data for the magneto-optical disk 22 becomes even more dense, the ratio of C(carrier;data) to N(noise) of the reproduced signal is reduced due to the fluctuation caused by the dispersion of recording conditions and the reproduction problems described above. The shift in wave pattern of the reproduction signal also becomes large.

For this purpose, each of the circuits illustrated in FIG. 13 (that is, a pattern read circuit 7 and an ideal value determining circuit 8) is connected to each of the two bit-by-bit recorders 26-1 and 26-2 described in FIG. 14.

Figure 1:
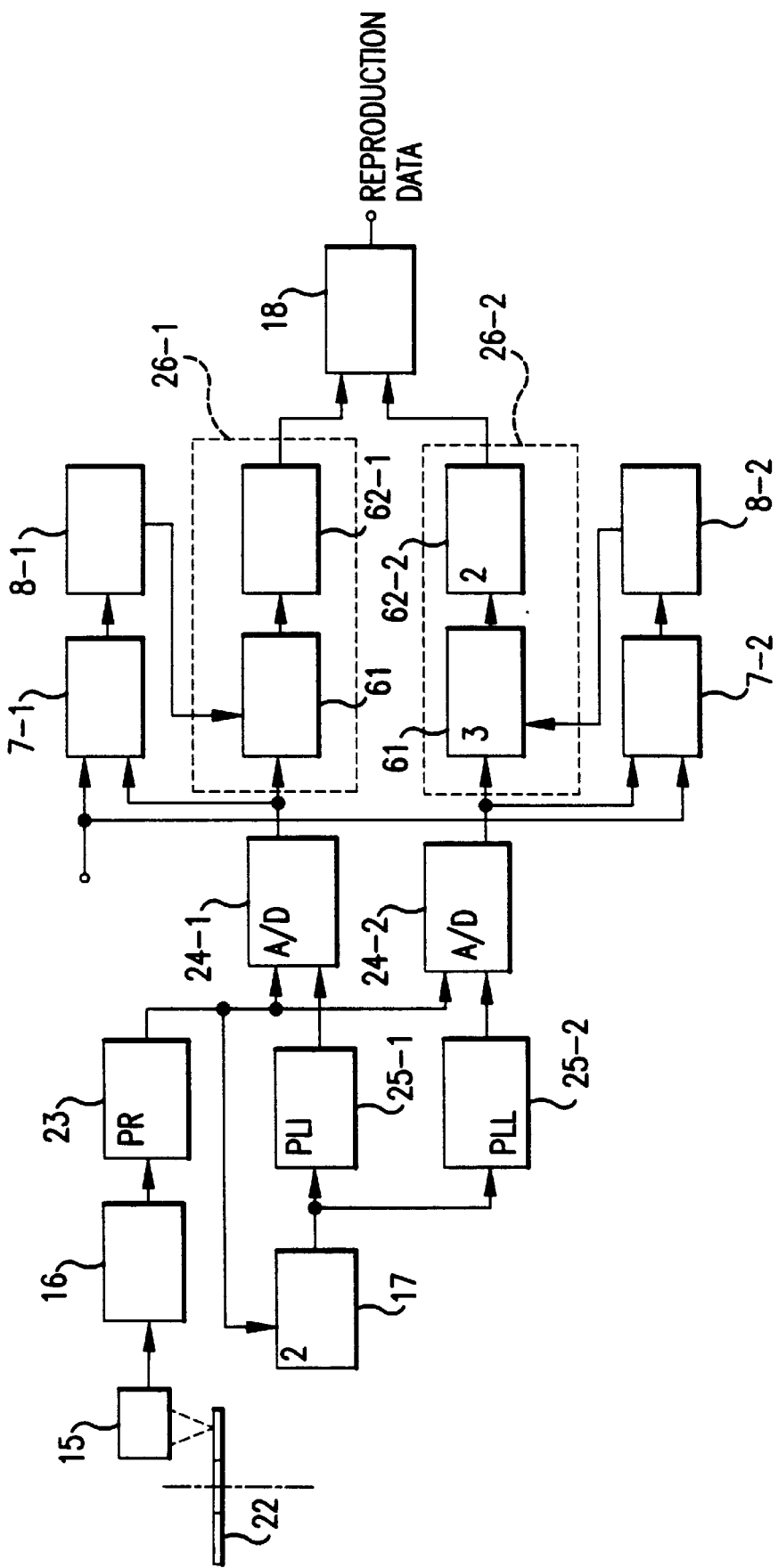
FIG. 1 is a block diagram illustrating the data reproduction apparatus of a first embodiment of the present invention.

FIG. 1 is a block diagram illustrating a data reproduction apparatus in which an ideal value determining circuit 8-1 is connected to the input side of the ternary coded decoder 61 of the bit-by-bit decoder 26-1 and a pattern read circuit 7-1 is connected to the input side of the ideal value determining circuit 8-1. An ideal value determining circuit 8-2 is connected to the input side of the ternary coded decoder 61 of the bit-by-bit decoder 26-2 and a pattern read circuit 7-2 is connected to the input side of the ideal value determining circuit 8-2.

Figure 12:
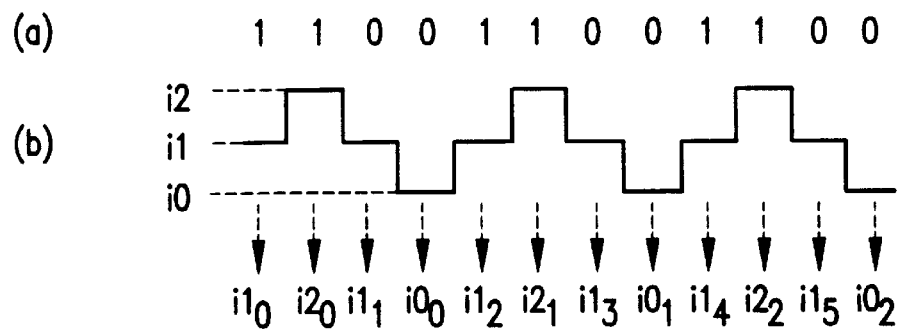
FIG. 12 is a diagram illustrating the format of the training pattern to be recorded in a magneto-optical disk.

Each of the pattern read circuits 7-1 and 7-2 inputs data from the training pattern region TP shown in FIG. 11 and feeds it to corresponding ideal value determining circuits 8-1 and 8-2 prior to reproduction of the user data recorded on the magneto-optical disk 22. The ideal value determining circuits 8-1 and 8-2 determine, from the sample data of the training pattern obtained, which is illustrated in FIG. 12(*b*), the ideal amplitude values i2, i1, and i0 corresponding to the ternary code levels of the maximum, and the central and the minimum. Ideal value determining circuits 8-1 and 8-2 give the results to each ternary coded decoder 61 of the bit-by-bit decoders 26-1, 26-2 respectively.

As a result, if the ideal amplitude values obtained from the ideal value determining circuit are i2, i1 and i0, each ternary coded decoder 61 establishes a threshold value level between i2 and i1 and another threshold value level between i1 and i0 as described above. Hence, the threshold value level is fixed precisely and the logic of the subsequent sample data is determined accurately. In this manner, even if the user data is recorded on magneto-optical disk 22 with a high density, the user data is reproduced accurately because the training pattern is reproduced and ideal amplitude value is determined prior to reproduction of user data. The subsequent user data is decoded based on the ideal amplitude value determined.

In the ideal value determining circuit 8-1, the leading edge of sample data of the training pattern reproduction signals is used in determining the central level among the maximum, the central and the minimum levels. Moreover, in the ideal value determining circuit 8-2, the trailing edge of sample data of the training pattern reproduction signals is used.

When such ideal value determining circuits 8-1 and 8-2 are applied to the first determination method of the ideal amplitude value described above, the ideal amplitude value determining operation becomes as follows. Ideal value determining circuit 8-1 screens the sample data integrated at the pattern read circuit 7-1 from the beginning into three logic levels by the two threshold value levels. Then it outputs the first sample data belonging to each group as ideal amplitude values in the case of the maximum and the minimum values of the data. It outputs the first sample data corresponding to the leading edge of the reproduction signal as ideal amplitude value in the case of the central value. In short, in this case, i20, i10, i00 are selected from the data shown in FIG. 12(*b*) as ideal amplitude values i2, i1 and i0.

Likewise, the ideal value determining circuit 8-2 screens the sample data integrated at the pattern read circuit 7-2 from the beginning into three logic levels by the two threshold value levels. Then it outputs the first sample data belonging to each group as ideal amplitude values in the case of the maximum and the minimum values of the data. It outputs the first sample data which corresponds to the back edge of the reproduction signal as ideal amplitude value in the case of the central value. In short, in this case, i20, i11, i00 are selected from the data described in FIG. 12(*b*) as ideal amplitude values i2, i1 and i0.

Figure 2:
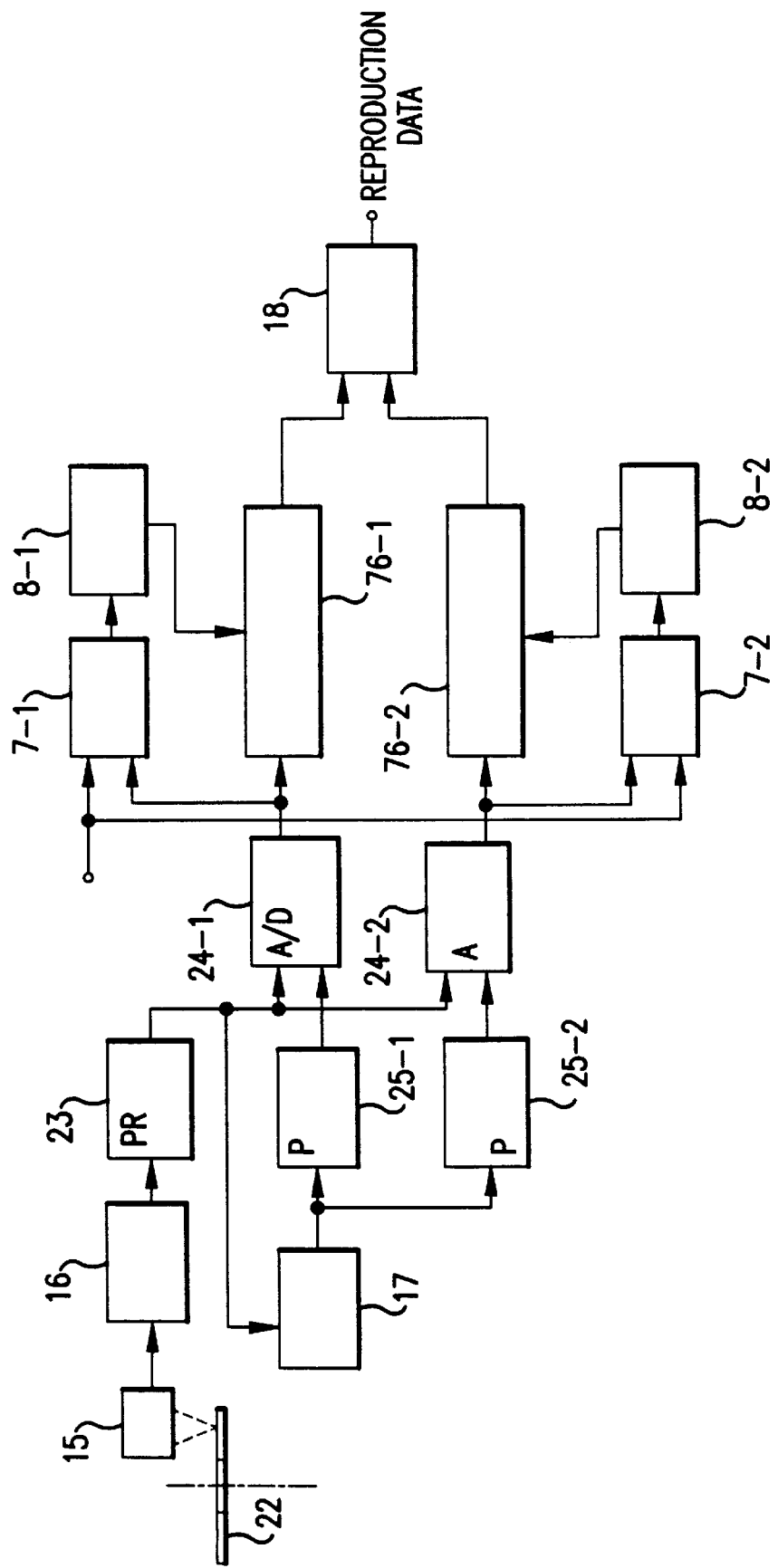
FIG. 2 is a block diagram illustrating the data reproduction apparatus of a second embodiment of the present invention.

In this manner, an example of the data reproduction apparatus of the present invention which uses two bit-by-bit decoders 26-1 and 26-2 to decode sample data by the leading edge of the clock signal and the trailing edge of the clock signal is described, but the present invention may be applied to a PRML system shown in FIG. 2. In such a case, two viterbi decoders 76-1 and 76-2 are used, with the viterbi decoder 76-1 decoding the sample data by the leading edge of the clock signal and the viterbi decoders 76-2 decoding the sample data by the trailing edge of the clock signal. The output from each of the viterbi decoders 76-1 and 76-2 is synthesized by data synthesizing circuit 18.

Incidentally, such data reproduction apparatus may also be applied to a recording reproduction apparatus. In other words, if the data reproduction apparatus of FIG. 1 is desired to be used as a record reproduction apparatus, a precoder is added to the head illustrated in FIG. 1. However, a precoder is unnecessary for a data reproduction apparatus of FIG. 2 since it uses a viterbi decoder.

In the present embodiment, although an example of a data reproduction apparatus using a PR(1,1) system is described, the data reproduction apparatus may be applied to other PR methods.

Figure 17:
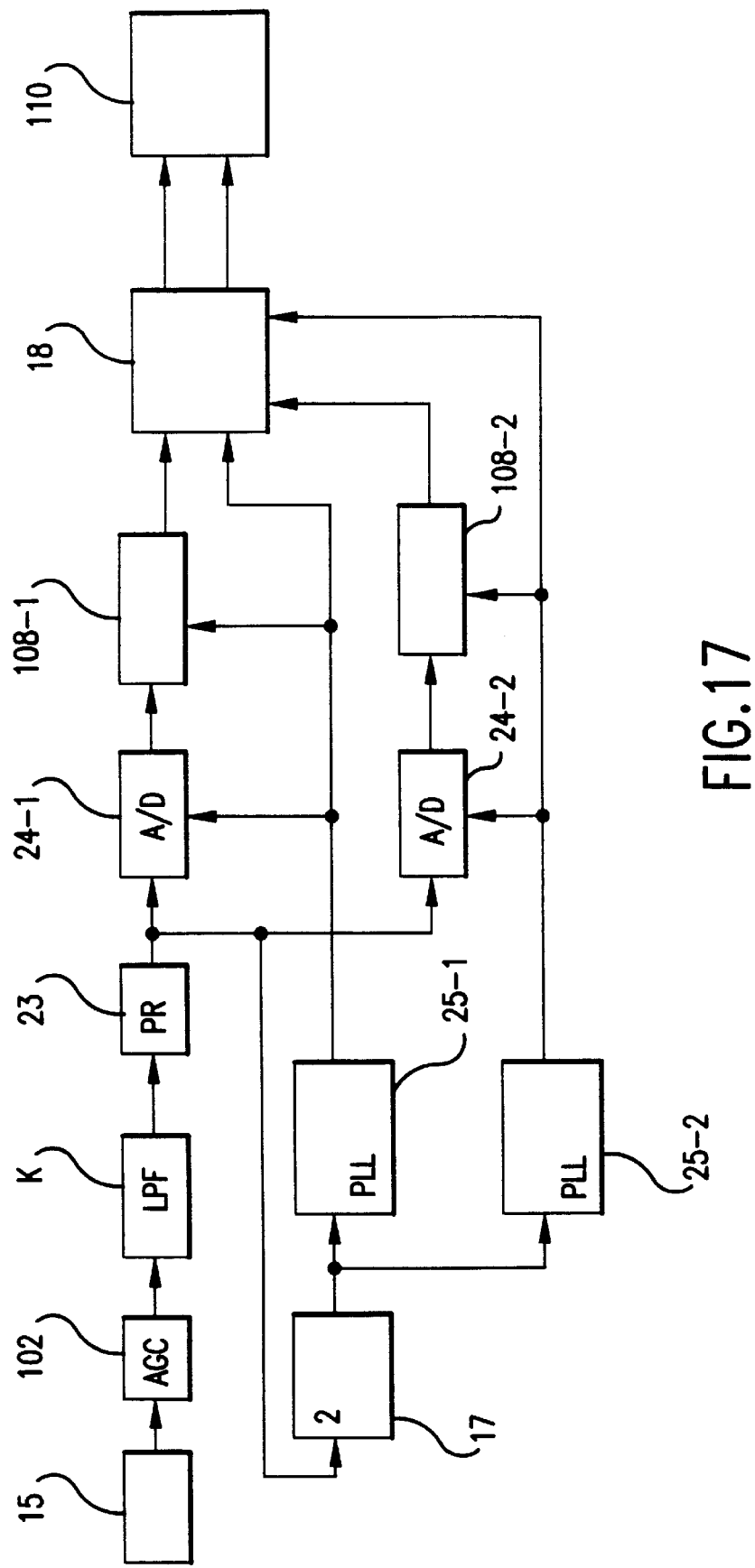
FIG. 17 is a block diagram illustrating the data reproduction apparatus in a third embodiment of the present invention.

FIG. 17 is a block diagram describing a structure of the data reproduction apparatus of another embodiment of the present invention.

In FIG. 17, head 15 emits a laser beam to a recording medium (such as a magneto-optical disk), and outputs reproduction signals by receiving and performing photoelectric conversion on the reflecting beam. AGC circuit 102 inputs the reproduction signals from the head 15 and outputs reproduction signals with predetermined amplitude after absorbing the dispersion of the reproduction signal amplitudes caused by differences of the reflection indices of the disks.

The lowpass filter 16 inputs reproduction signals output from the AGC circuit 102 and reduces the high frequency noise which is outside of the frequency band of the reproduction signals.

The partial response equalizing circuit 23 comprises a transversal filter and a delay line. It inputs the reproduction signals output from the lowpass filter 16 and equalizes the wave pattern so that the wave pattern of the reproduction signals become the partial response wave pattern.

Explanation of equalizing of the wave pattern here is the same as that in FIG. 3.

Hereafter, the reproduction data read from the reproduction signals will be considered. As illustrated in FIG. 3(*d*), a data string of 0110 recorded at NRZ (Non Return to Zero) are transformed to a data string of 01210 shown in FIG. 3(*e*) in the PR(1,1) method. In short the string becomes ternary data. Hence, in the PR(1,1) method, the ternary discrimination of the transformed data string is performed and a process is executed to restore the original binary signal.

The binary code circuit 17 transforms the reproduction signals output from the wave pattern equalizing circuit 23 into binary signals. This is accomplished by determining whether the level of reproduction signals PR-equalized (PR: partial response) is higher than the predetermined threshold value.

The PLL circuit 25-1 extracts a clock signal which is synchronized to the timing of the leading edge of the reproduction signal pulse binary coded by binary code circuit 17. Moreover, the PLL circuit 25-2 extracts a clock signal which is synchronized to the timing of the trailing edge of the reproduction signal pulse binary coded by the binary code circuit 17. The clock signal extracted by the PLL circuit 25-1 is input in A/D converter circuit 24-1 and the clock extracted by the PLL circuit 25-2 is input in the A/D converter circuit 24-2.

The A/D converter circuit 24-1 transforms the reproduction signal level into a digital value with the timing of the clock output from the PLL circuit 25-1. A/D converter circuit 24-2 transforms the reproduction signal level into a digital value with the timing of the clock signal output from the PLL circuit 25-2. The digital values transformed by A/D converter circuit 24-1 and A/D converter circuit 24-2 are input in the decoding circuit 108-1 and decoding circuit 108-2 respectively.

The decoding circuit 108-1 performs a ternary discrimination based on the value output from A/D converter circuit 24-1 and transforms the value into binary code. At this time ternary discrimination is performed with the timing of the clock pulse from PLL circuit 25-1. The decoding circuit 108-2 performs a ternary discrimination based on the value output from the A/D converter circuit 24-2 and transforms the value into binary code. At this time the ternary discrimination is performed with the timing of the clock pulse from the PLL circuit 25-2. The data transformed to binary code by the decoding circuit 108-1 and the decoding circuit 108-2 are input in the data synthesizing circuit 18.

The data synthesizing circuit 18 synthesizes data from the decoding circuit 108-1 (data transformed to binary code with the timing of the clock pulse, which is synchronized to the leading edge of the mark) and data from the decoding circuit 108-2 (data transformed to binary code with the timing of the clock pulse which is synchronized to the trailing edge of the mark), and generates one original binary data. The binary data generated by the data synthesizing circuit is input to the data demodulating circuit 110.

The signals recorded on the disk are modulated during recording, hence, reproduction signals are demodulated during reproduction.

Figure 18A:
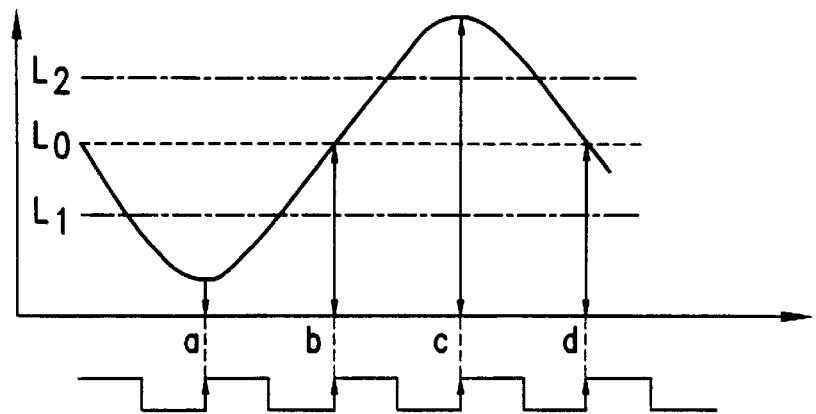
FIGS. 18(a)–18(c) are a signal wave pattern diagrams illustrating a signal process in the data reproduction apparatus of the present invention.
Figure 18B:
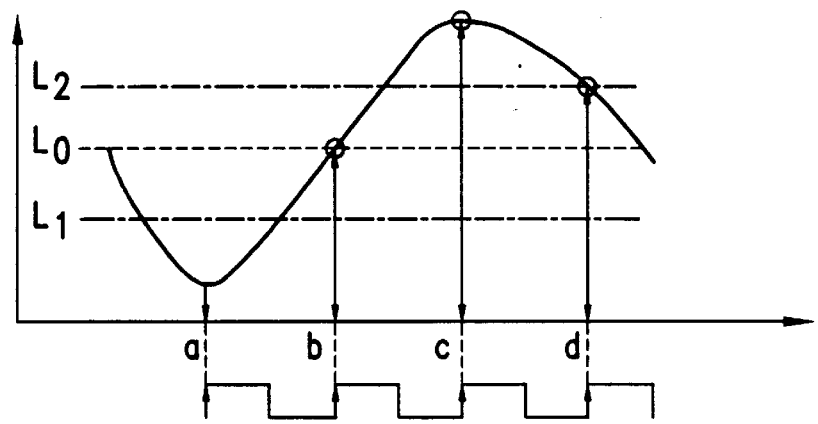
Figure 18C:
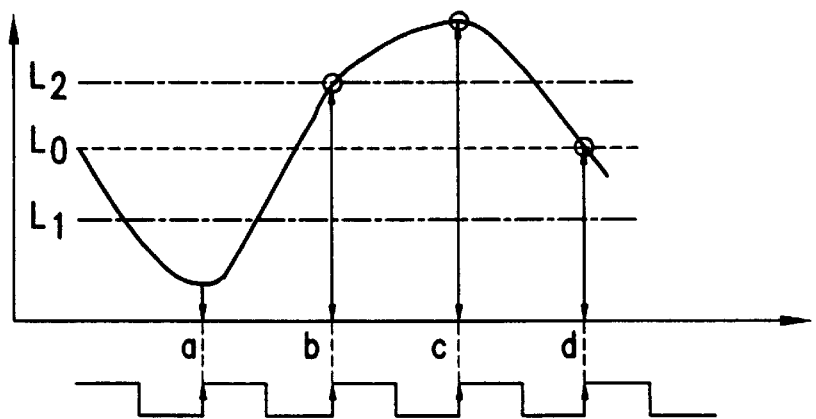

FIG. 18(*a*) illustrates an ideal reproduction signal wave pattern and the wave pattern of the clock signal which is synchronized to the signals obtained by changing the reproduction signals to binary code when the reproduction signals of a data string 001100 which is NRZ-recorded are PR-equalized.

The binary coded threshold value is set to the center of the signal amplitude (level shown with a symbol L0 in FIG. 18(*a*)).

In the case of a reproduction signal in which the mark is recorded correctly as in the case illustrated in FIG. 18(*a*), both clock signals synchronized to the leading edge and the trailing edge of the binary coded signals (the clock signals output from the PLL circuit 25-1 and the PLL circuit 25-2) have the same phase as the clock signal shown in FIG. 18(*a*).

The A/D converter circuits 24-1 and 24-2 perform A/D converter of the reproduction signals at the rising edge of each of the clock inputs and outputs the results. In short, it outputs the reproduction signal levels at each of the times a, b and c.

The decoding circuit 108-1, 108-2 compare the ternary discrimination level (levels shown by symbols L1 and L2 at FIG. 18(*a*)) with the reproduction levels and determines the values at time a, b, c as 0, 1, 2 respectively, then decodes the value to original binary data.

If the data string 001100 which is NRZ-recorded is PR-equalized, it is transformed to the ternary data string 001210. Hence, in ternary discrimination, if a data string 001210 is obtained, a data string 001100 may be restored by the decoding process.

The ternary discrimination level is established by dividing the reproduction signal amplitude level into four parts based on the levels L1, L2 in the FIG. 18(*a*). Level L1 is established in the bottom quarter of the amplitude level and level L2 is established in the top quarter of the amplitude level.

FIGS. 18(*b*) and 18(*c*) illustrate the reproduction signal wave pattern when the same data string as FIG. 18(*a*) is recorded with shifted recording condition of the mark.

FIG. 18(*b*) also illustrates the wave pattern of the clock which is synchronized to the leading edge of the mark. Moreover, FIG. 18(*c*) also illustrates the wave pattern of the clock pulse which is synchronized to the trailing edge of the mark.

The ternary discrimination of the decoding circuit 108-1 in FIG. 18(*b*) determines the point b to be 1 and the point c to be 2. However, the point d is originally 1 but it is often determined to be 2. In this case, the data string originally 121 is determined to be the data string of 122.

The ternary discrimination of the decoding circuit 108-2 in FIG. 18(*c*) determines the point c to be 2 and the point d to be 1. However, the point b is originally 1 but it is often determined to be 2. In this case, the data string originally 121 is determined to be the data string of 221.

As a result, when the reproduction data are decoded in either decoding circuit 108-1 or 108-2, the data string originally 0110 often is decoded 01110.

Hence, in the data synthesizing circuit 18 of the present invention, each data pulse is generated by the timing of the leading edge section of the data pulse output from the decoding circuit 108-1 and by the timing of the trailing edge section of the data pulse output from the decoding circuit 108-2. In short, the two data pulses are synthesized.

Figure 19:
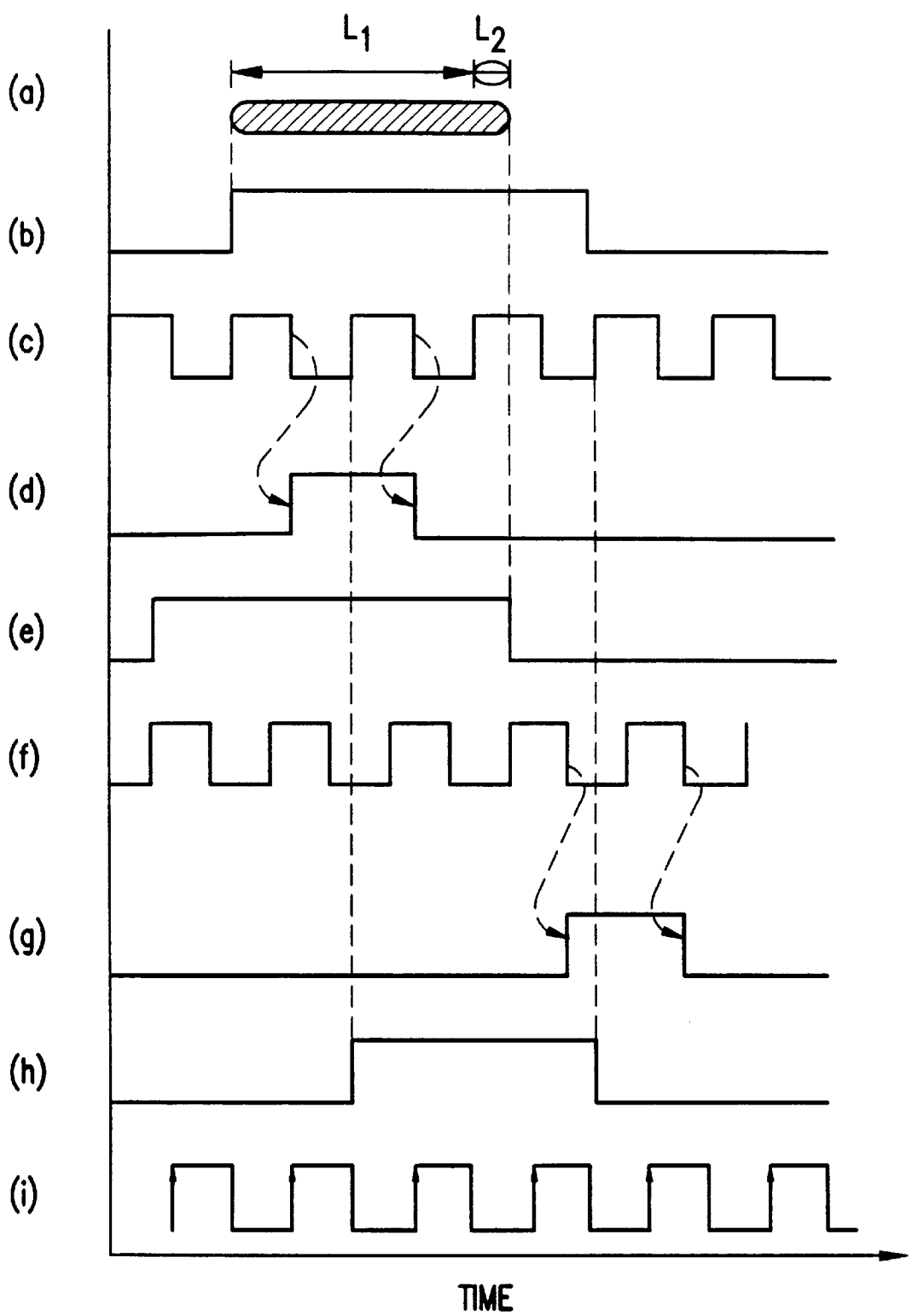
FIG. 19 is a timing chart of the data synthesizing circuit of the data reproduction apparatus of the present invention.

FIG. 19 is a timing chart illustrating the operation of the data synthesizing circuit 18. FIG. 19(*a*) illustrates the shape of the mark recorded on the magneto-optical disk. This mark corresponds to the data string 0110. The string should originally be recorded with the length of L1 but it is recorded longer due to shift by L2. Hence it is decoded as 01110 as described in the examples of FIGS. 19(*b*) and 19(*c*).

FIG. 19(*b*) illustrates the output signal from decoding circuit 108-1 corresponding to the mark in FIG. 19 (*a*). This signal is synchronized to the leading edge of the mark. FIG. 19(*c*) illustrates the clock signal output from the PLL circuit 25-1. This clock signal is synchronized to the leading edge of the mark. FIGS. 19(*d*) is the signal generated by FIGS. 19(*b*) and 19(*c*), and is a pulse signal synchronized to the leading edge of the mark. In other words, the pulse in FIG. 19(*c*) rises with the timing of the first fall of the clock pulse of FIG. 19(*c*) after rising with the pulse signal of FIG. 19(*b*), and falls with the timing of the next fall of the clock of FIG. 19(*c*). Therefore, the pulse of FIG. 19(*d*) has the length of one cycle of the clock pulse of FIG. 19(*c*).

FIG. 19(*e*) illustrates the output signal from the decoding circuit 108-2 corresponding to the mark in FIG. 19 (*a*). This signal is synchronized to the back edge of the mark. FIG. 19(*f*) describes the clock signal output from the PLL circuit 25-2. This clock signal is synchronized to the trailing edge of the mark. FIG. 19(*g*) is the signal generated by FIG. 19(*e*) and 19(*f*), and is a pulse signal synchronized to the trailing edge of the mark. In other words, the pulse in FIG. 19(*g*) rises with the timing of the first fall of the clock pulse of FIG. 19(*f*) after falling with the pulse signal of FIG. 19(*e*), and falls with the timing of the next fall of the clock pulse of FIG. 19(*f*). Therefore, the pulse of FIG. 19(*g*) has the length of one cycle of the timing of the pulse clock of FIG. 19(*f*).

FIG. 19(*h*) illustrates data signals output from the data synthesizing circuit 18. Moreover, FIG. 19(*i*) illustrates the clock signals output from the data synthesizing circuit 18. The clock signal of FIG. 19(*i*) is same as the clock signal from the PLL circuit 25-1. The pulse signal of FIG. 19(*h*) rises with the timing of the first fall of the clock signal of FIG. 19(i) after rising of the pulse of FIG. 19(d), and falls with the timing of the first fall of the clock signal of FIG. 19(i) after rising of the pulse of FIG. 19(g).

In the manner described above, the pulse signal (FIG. 19(h)) with the length corresponding to the original length L1 of the mark of FIG. 19(a) is obtained.

The data signal (FIG. 19(h)) and the clock signal (FIG. 19(i)) which are output from the data synthesizing circuit 18 are input to the data remodulating circuit 110. The data remodulating circuit 110 is able to obtain the data string 0110 by reading the level of the data signal input with the timing of the rise of the clock signal.

As explained above, even in reproduction data from the recording medium for which marks are not recorded correctly due to shifts in recording conditions, reproduction is performed correctly in the present invention.

Moreover, even if the length of data as recorded is longer or shorter than reference values due to change in recording conditions associated with a magneto-optical disk, the reproduced user data may be decoded correctly and the bit errors which occur in the reproduction data may be reduced.

Moreover, the first and the second ideal value determining circuits are made to determine ideal amplitude values from each of the sample data of the training pattern in the second region of the magneto-optical disk. There ideal amplitude values are reproduced before the user data to give the results to the first and the second decoding circuits. With this, the recording density of the user data for the magneto-optical disk becomes high. As a result, reproduction signals are decoded accurately and provided to the data before recording. This is accomplished even when the wave pattern shift of the reproduction signals becomes large due to overlapping of the reproduction signals. This pattern shift may be caused by recording and reproduction conditions and fluctuations of the reproduction signals.

Moreover, the first and the second ideal value determining circuits are made to determine the ideal amplitude value from each of the sample data which is synchronized to the leading edge and the trailing edge of binary signals. The ideal value determining circuit feeds the results to the first and the second decoding circuits. Thus, accurate decoded data is generated and recorded on a magneto-optical disk with high density when reproducing and decoding user data.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A data reproduction apparatus comprising:

an equalizer circuit which equalizes reproduction signals by means of a partial response method;

a binary code circuit which converts the reproduction signals into binary coded signals;

a PLL circuit which generates clock signals synchronizing a front edge of the binary coded signals from said binary code circuit and generates clock signals synchronizing a trailing edge of the binary coded signals from said binary code circuit;

a decoding circuit which transforms the equalized reproduction signals into binary signals by means of the clock signals synchronized to the front edge of the binary coded signals and transforms the equalized reproduction signals into binary signals by means of the clock signals synchronized to the trailing edge of the binary coded signals; and a synthesis circuit which synthesizes the output signals from said decoding circuit.

2. A data reproduction apparatus according to claim 1, wherein said PLL circuit includes a first PLL circuit which generates clock signals synchronizing a front edge of the binary coded signals from said binary code circuit and a second PLL circuit which generates clock signals synchronizing a trailing edge of the binary coded signals from said binary code circuit.

3. A data reproduction apparatus according to claim 1, wherein said decoding circuit includes a first decoding circuit which transforms the equalized reproduction signals into binary signals by means of the clock signals synchronized to the front edge of the binary coded signals and a second decoding circuit which transforms the equalized reproduction signals into binary signals by means of the clock signals synchronized to the trailing edge of the binary coded signals.

4. A data reproduction apparatus comprising:

equalizing means for equalizing reproduction signals by means of a partial response method;

binary code means for changing the reproduction signals into binary coded signals;

PLL means for generating clock signals synchronizing a front edge of the binary coded signals and for generating clock signals synchronizing a trailing edge of the binary coded signals from said binary code means;

A/D conversion means for converting said equalized reproduction signals with said clock signals synchronized to the front edge of the binary coded signals to produce first output signals and for converting said equalized reproduction signals with the clock signal synchronized to the trailing edge of the binary coded signals to produce second output signals;

decoding means for transforming said first output signals from said A/D conversion means into first binary signals and for transforming said second output signals into second binary signals; and synthesis means for synthesizing said first and said second binary signals.

5. The data reproduction apparatus according to claim 4, wherein said PLL means includes:

a first PLL circuit which generates clock signals synchronizing the front edge of the binary coded signals from said binary code means; and a second PLL circuit which generates clock signals synchronizing the trailing edge of the binary coded signals from said binary code means.

6. The data reproduction apparatus according to claim 5, wherein said A/D conversion means includes:

a first A/D conversion circuit which A/D-transforms the equalized reproduction signals with the clock signal from said first PLL circuit; and a second A/D conversion circuit which A/D-transforms the equalized reproduction signals with the clock signal from said second PLL circuit.

* * * * *